(12) United States Patent
Srinivasan et al.

(10) Patent No.: US 10,235,325 B2
(45) Date of Patent: Mar. 19, 2019

(54) CONTROL PATH TO ENABLE AT LEAST ONE OF TWO DATA PATHS FOR A NETWORK DEVICE

(71) Applicant: Microsoft Technology Licensing, LLC, Redmond, WA (US)

(72) Inventors: Harish Srinivasan, Sammamish, WA (US); Yonghong Yang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 15/367,693

(22) Filed: Dec. 2, 2016

(65) Prior Publication Data

US 2018/0095926 A1 Apr. 5, 2018

Related U.S. Application Data

(60) Provisional application No. 62/402,363, filed on Sep. 30, 2016.

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01)

(58) Field of Classification Search
None
See application file for complete search history.

(56) References Cited

U.S. PATENT DOCUMENTS

| 4,688,168 | A | 8/1987 | Gudaitis et al. |
| 5,170,470 | A | 12/1992 | Pindar et al. |
| 5,682,552 | A | 10/1997 | Kuboki et al. |
| 5,692,211 | A | 11/1997 | Gulick et al. |
| 5,717,875 | A | 2/1998 | Cutlerywala et al. |
| 5,737,546 | A | 4/1998 | Fenwick et al. |

(Continued)

OTHER PUBLICATIONS

"Data Transmission I/O Devices", Published on: Dec. 29, 2015 Available at: http://machineryequipmentonline.com/electric-equipment/data-transmission-interfacesdata-transmission-io-devices/.

(Continued)

*Primary Examiner* — Idriss N Alrobaye
*Assistant Examiner* — Dayton Lewis-Taylor
(74) *Attorney, Agent, or Firm* — Ranjeev Singh; Singh Law, PLLC (57) ABSTRACT

Methods and systems that provide for a control path to enable at least one of the two data paths for a network device (e.g., a modem) are provided. An example method includes allowing a device to communicate data, over a network, using a shared control path, within the device, corresponding to a first bus protocol. The method may include using the shared control path, obtaining control information corresponding to a data path, within the device, for allowing the device to communicate data over the network using a network interface. The method may further include automatically determining data transfer capabilities for transmitting or receiving data using the network interface based on the control information, if the data transfer capabilities are determined to be capable of supporting a first data path. The first data path that uses a different protocol from the first bus protocol may be automatically established.

20 Claims, 5 Drawing Sheets

(56) References Cited

U.S. PATENT DOCUMENTS

| | | | |
|---|---|---|---|
| 5,754,807 | A | 5/1998 | Lambrecht et al. |
| 5,774,744 | A | 6/1998 | Story et al. |
| 5,809,333 | A | 9/1998 | Story et al. |
| 6,654,845 | B1 | 11/2003 | Morris et al. |
| 6,892,243 | B1 | 5/2005 | Skarpness |
| 7,421,520 | B2 | 9/2008 | Wilkins et al. |
| 7,532,636 | B2 | 5/2009 | Yap et al. |
| 7,769,056 | B2 | 8/2010 | Hartwich |
| 9,282,181 | B2 | 3/2016 | Antos et al. |
| 2002/0120804 | A1 | 8/2002 | Belonoznik |
| 2013/0326541 | A1 | 12/2013 | Scafidi, Jr. et al. |
| 2014/0207991 | A1 | 7/2014 | Kaushik et al. |
| 2014/0289794 | A1 | 9/2014 | Raleigh et al. |
| 2015/0055452 | A1 | 2/2015 | Lee |
| 2016/0217093 | A1 | 7/2016 | Whittington et al. |

OTHER PUBLICATIONS

Korver, Niels, "Adequacy of the Universal Serial Bus for real-time systems", Published on: May 2003 Available at: http://doc.utwente.nl/56344/1/Korver03adequacy.pdf.

"Cellular Architecture and Implementation", Published on: Sep. 3, 2016 Available at: https://msdn.microsoft.com/en-us/windows/hardware/drivers/network/cellular-architecture-and-driver-model.

"Universal Serial Bus Communications Class Subclass Specification for Mobile Broadband Interface Mode", Published on: May 1, 2013 Available at: ofmodemsandmen.com/download/MBIM%20v1%200.pdf.

"USB CDC/NCM Class Driver for Windows CE and Embedded Compact Host-side Device Driver Reference Manual", Published on: Jul. 10, 2014 Available at: http://www.thesycon.de/cdcncmce/usbcdencm_wce_manual.pdf.

CONTROL PATH TO ENABLE AT LEAST ONE OF TWO DATA PATHS FOR A NETWORK DEVICE

This application claims the benefit of priority under 35 U.S.C. § 119 to U.S. Provisional Patent Application No. 62/402,363, filed on Sep. 30, 2016 in the U.S. Patent and Trademark Office, the disclosure of which is incorporated herein in its entirety by reference.

BACKGROUND

Increasingly, many computing systems, including smart phones and tablets use wireless network devices to communicate with a variety of wireless networks, such as cellular networks, including LTE, Video over LTE (ViLTE), and Voice over LTE (VoLTE). Such high-speed cellular networks and technologies allow the computing systems to deliver multimedia experiences for their users, including live video. The multimedia experiences may be provided via various applications installed on such computing systems, including applications such as Skype™, WhatsApp, or other applications. An operating system, such as Windows®, installed on the computing system allows these applications to use the wireless network device (e.g., a modem) to transmit and receive data. The speed of the data transfer between the cellular network and an application, such as Skype™, depends upon several aspects, including the bandwidth of the cellular network connection, the data transfer capabilities of the network device, and the data transfer capabilities of the operating system and its interface with the network device.

Such interfaces between the wireless network device and the operating system have been standardized to allow such interfaces to be widely usable. The standardized interfaces are closely tied to a specific bus protocol and hence they may inadvertently limit the data transfer rate to the bus protocol being used with the operating system. Thus, there is a need for methods and systems that provide for a control path to enable at least one of the two data paths for a network device (e.g., a modem).

SUMMARY

In one example, the present disclosure relates to a method for allowing a device to communicate data, over a network, using a shared control path, within the device, corresponding to a first bus protocol. The method may include using the shared control path, obtaining control information corresponding to a data path, within the device, for allowing the device to communicate data over the network using a network interface. The method may further include automatically determining data transfer capabilities for transmitting or receiving data using the network interface based on the control information, if the data transfer capabilities are determined to be capable of supporting a first data path, within the device, automatically establishing the first data path within the device having a first data rate, where the first data path does not correspond to the first bus protocol, and if the data transfer capabilities are determined to be incapable of supporting the first data path, automatically establishing a second data path within the device having a second data rate lower than the first data rate, where the second data path corresponds to the first bus protocol.

In another example, the present disclosure relates to a computer-readable medium comprising instructions corresponding to a method for allowing a device to communicate data, over a network, using a shared control path, within the device, corresponding to a first bus protocol. The method may include using the shared control path, obtaining control information corresponding to a data path, within the device, for allowing the device to communicate data over the network using a network interface. The method may further include automatically determining data transfer capabilities for transmitting or receiving data using the network interface based on the control information, if the data transfer capabilities are determined to be capable of supporting a first data path, within the device, automatically establishing the first data path within the device having a first data rate, where the first data path does not correspond to the first bus protocol, and if the data transfer capabilities are determined to be incapable of supporting the first data path, automatically establishing a second data path within the device having a second data rate lower than the first data rate, where the second data path corresponds to the first bus protocol.

In yet another example, the present disclosure relates to a system including a processor and a modem, coupled to the processor via at least one bus, to allow the processor to communicate data over a network. The system may further include a mobile broadband driver, configured to allow the processor to: using a shared control path corresponding to a first bus protocol, obtain control information corresponding to a data path, within the device, for communicating data over the network using the modem, and automatically determine data transfer capabilities for allowing the processor to communicate data using the modem based on the control information, if the data transfer capabilities are determined to be capable of supporting a first data path, within the device, automatically establish the first data path within the device having a first data rate, where the first data path does not correspond to the first bus protocol, and if the data transfer capabilities are determined to be incapable of supporting the first data path, automatically establish a second data path, within the device, having a second data rate lower than the first data rate, where the second data path corresponds to the first bus protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to a control path for enabling at least one of two independent data paths for a network device. The network device may be a mobile broad device that uses the Mobile Broadband Interface Model (MBIM) to exchange information with the host (e.g., the operating system). An emulated USB device may expose the MBIM function to allow the host to communicate with the network device using USB control and data pipes. The data pipe(s) may carry raw IP data streams and device service streams and the control pipe(s) may transport MBIM control messages. According to one example of the disclosure, the control pipe(s) may be used as a shared control path to enable one of at least two independent data paths, where one of the paths may use the data pipe(s) associated with the emulated USB device, whereas the other one may not use the data pipe(s); instead, this data path may include direct transfer of data between the network device and the host. In this example, the data path that uses the data pipe(s) may transmit and receive USB Subclass Specification for Network Control Model (NCM) transfer blocks (NTBs). The other data path, however, may include direct transfer of data from or to the network device without using the USB NTBs for the transfer of data.

Figure 1:
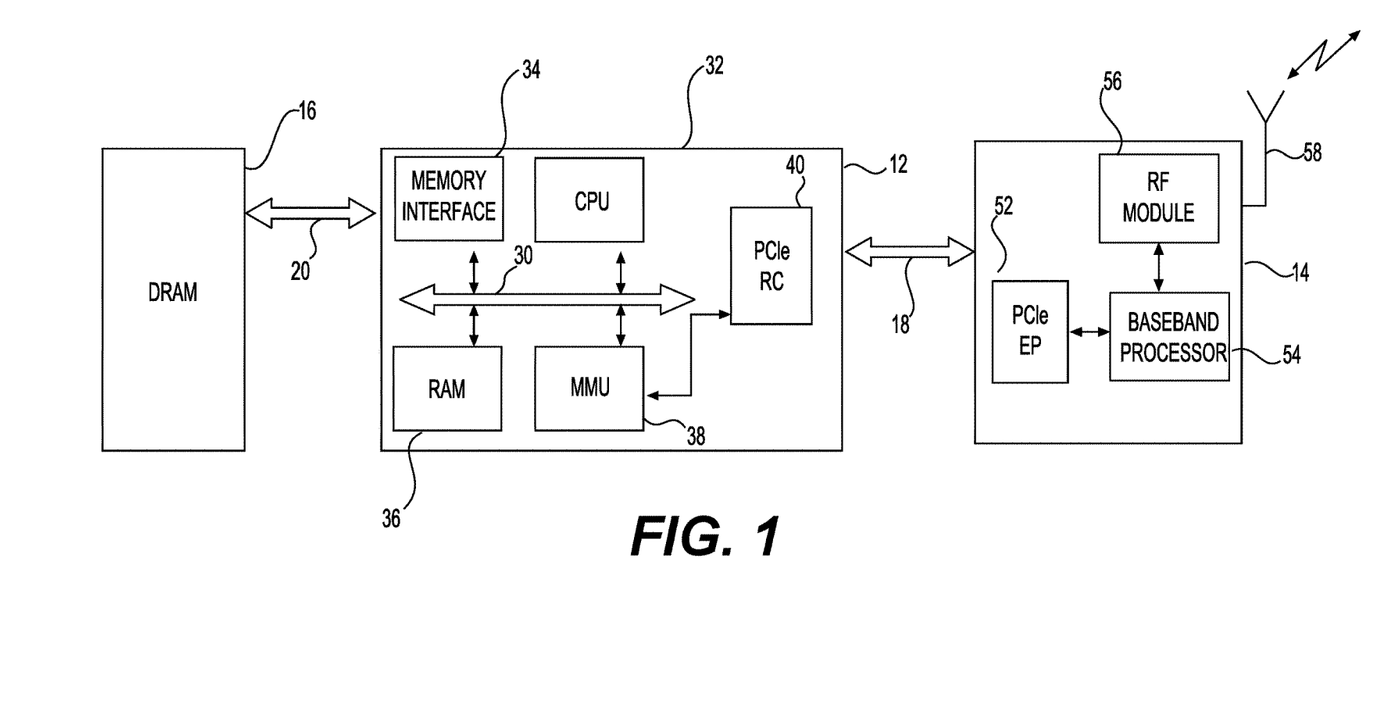
FIG. 1 shows a diagram of a computing system in accordance with one example.

FIG. 1 shows a diagram of a computing system 10 in accordance with one example. Computing system 10 may include a processor 12 coupled via a bus 20 to a memory (e.g., DRAM 16). Processor 12 may further be coupled to a network device (e.g., a modem 14) via bus 18. Processor 12 may include a CPU 32, a memory interface 34, a memory (e.g., RAM 36), and a memory management unit (MMU) 38, which may be coupled via bus 30. MMU 38 may be coupled to a PCI Express root complex (PCIe RC) 40. Modem 14 may include a PCI Express end point (PCIe EP) 52, a baseband processor 54, and a radio frequency (RF) module 56. Modem 14 may be coupled to antenna 58. Modem 14 may support cellular radio technologies, such as GSM, 3G, 4G, 5G, CDMA, LTE or other radio access networks. Computing system 10 may include an operating system and provide access to applications, such as Skype™ and WhatsApp. Although FIG. 1 shows a certain number of components of computing system 10 arranged in a certain manner, there could be more or fewer number of components arranged differently. In addition, various components of computing system 10 may be implemented using other technologies as well. As an example, DRAM 16 may be replaced or supplemented with a non-volatile memory, such as flash memory. As another example, although FIG. 1 shows a PCI Express bus 18 for coupling processor 12 to modem 14, other types of bus protocols may be used.

Figure 2:
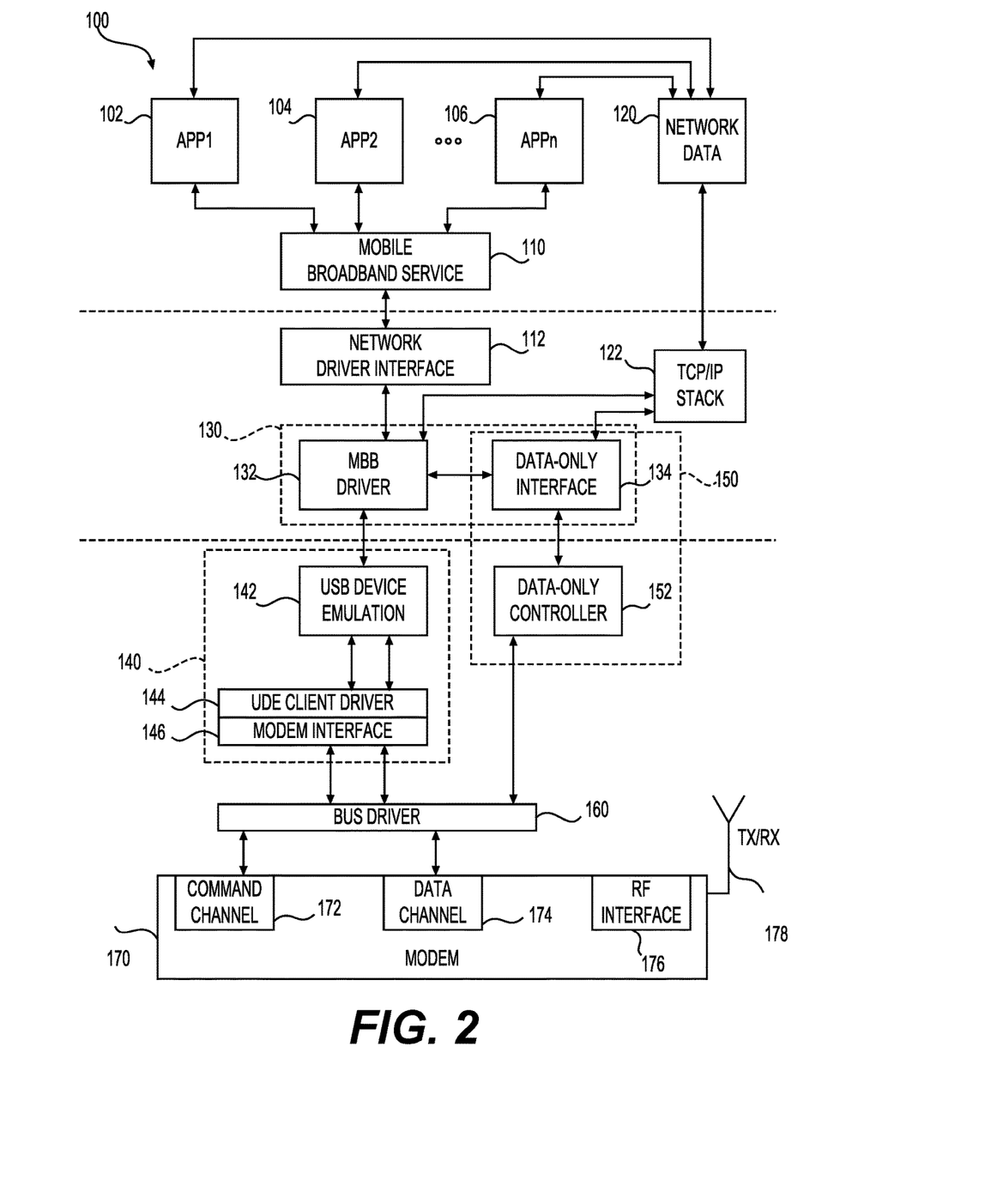
FIG. 2 shows a diagram of a system to enable one of at least two data paths for a network device in accordance with one example.

FIG. 2 shows an example system 100 that shows various components of a computing system (e.g., computing system 10 of FIG. 1) to enable one of at least two independent data paths for a network device via a shared control path. System 100 may provide access to various applications, such as APP1 102, APP2 104, and APPn 106, to a user of system 100. Such applications may include Skype™, WhatsApp, or other applications that allow a user to communicate with other users via a mobile broadband device, such as modem 14 of FIG. 1. In one example, these applications may reside in a storage and may be loaded into a memory, e.g., RAM 36 of FIG. 1 for execution by a processing unit, e.g. CPU 32 of FIG. 1. In this example, to transmit or receive data via a modem, applications such as APP1 102, APP2 104, and APPn 106 may communicate with a mobile broadband service 110 in the user space of an operating system. Mobile broadband service 110 may manage cellular connections by auto-configuring the networks. Mobile broadband service 110 may be implemented as a background process as part of the operating system. As an example, as part of the Windows® operating system, mobile broadband service may be implemented as the WWANSVC service. Mobile broadband service 110 may communicate with a network driver interface 112, which may be implemented as part of the kernel space of the operating system. Network driver interface 112 may specify a standard interface between the lower-level drivers that manage hardware and the upper-level drivers that interface with mobile broadband service 110. In one example, for the Windows® operating system, network driver interface 112 may be based on the Network Driver Interface Specification (NDIS) library. Network driver interface 112 may communicate with a mobile broadband interface 130 in the kernel space of the operating system. Mobile broadband interface 130 may provide the operating system with an interface to other components of system 100 that are part of the modem functionality. Mobile broadband interface 130 may include a mobile broadband (MBB) driver 132 and a data-only interface 134. Data from MBB driver 132 and data-only interface 134 may be communicated via a TCP/IP stack 122 to network data 120, which in turn, may send or receive data from the various applications shown in FIG. 2. Regarding the operation of computing system 10 of FIG. 1 with system 100, whenever MBB driver 132 needs to be loaded for a device that matches the MBIM compatible IDs, the operating system of computing system 10 may call the DriverEntry function for the driver. MBB driver 132 may register itself as a Miniport driver with NDI 112 by calling the NdisMRegisterMiniportDriver function.

With continued reference to FIG. 2, mobile broadband interface 130 may be coupled to a USB stack 140 and a data-only controller 152. USB stack 140 may exchange control information, including commands, with MBB driver 132. As part of this process command IDs may be used. USB stack 140 may also provide a data path for transmitting or receiving data using the modem via MBB driver 132. USB stack 140 may include a USB device emulation 142, a USB device emulation (UDE) client driver 144, and a modem interface 146. USB device emulation 142 may be implemented as a class extension driver to emulate a USB host controller. In this way, it may provide the function of a USB device emulator. UDE client driver 144 may be implemented as a virtual USB mobile broadband interface model (MBIM) device driver. Modem interface 146 may be implemented as an interface to a bus driver, such as bus driver 160. Modem interface 146 may implement the interfaces for communicating with modem 170 via a bus, such as a PCIe bus. Bus driver 160 may be coupled to modem 170. Modem 170 may include a command channel 172, a data channel 174, and a radio frequency (RF) interface 176. Modem 170 may further be coupled to an antenna 178 for transmitting or receiving data via modem 170. To transmit or receive data using modem 170, either a data path that uses USB NTBs may be used or a faster data path 150 may be used. Data path 150 may include a data-only interface 134, in the kernel space, for interfacing with MBB driver 132. Alternatively, data-only interface may be included as part of MBB driver 132. Data path 150 may further include a data-only controller 152 for transmitting and receiving data using the modem by directly communicating with bus driver 160. Although FIG. 2 shows a certain number of components of system 100 arranged in a certain manner, there could be more or fewer number of components arranged differently. In addition, various components of system 100 may be implemented using other technologies as well. As an example, TCP/IP stack 122 may be replaced or supplemented with other transport stacks. As another example, although FIG. 2 shows a USB stack for communicating control information for using the modem, other types of bus protocol stacks may be used. As an example, control information may be communicated using PCI Express.

Figure 3:
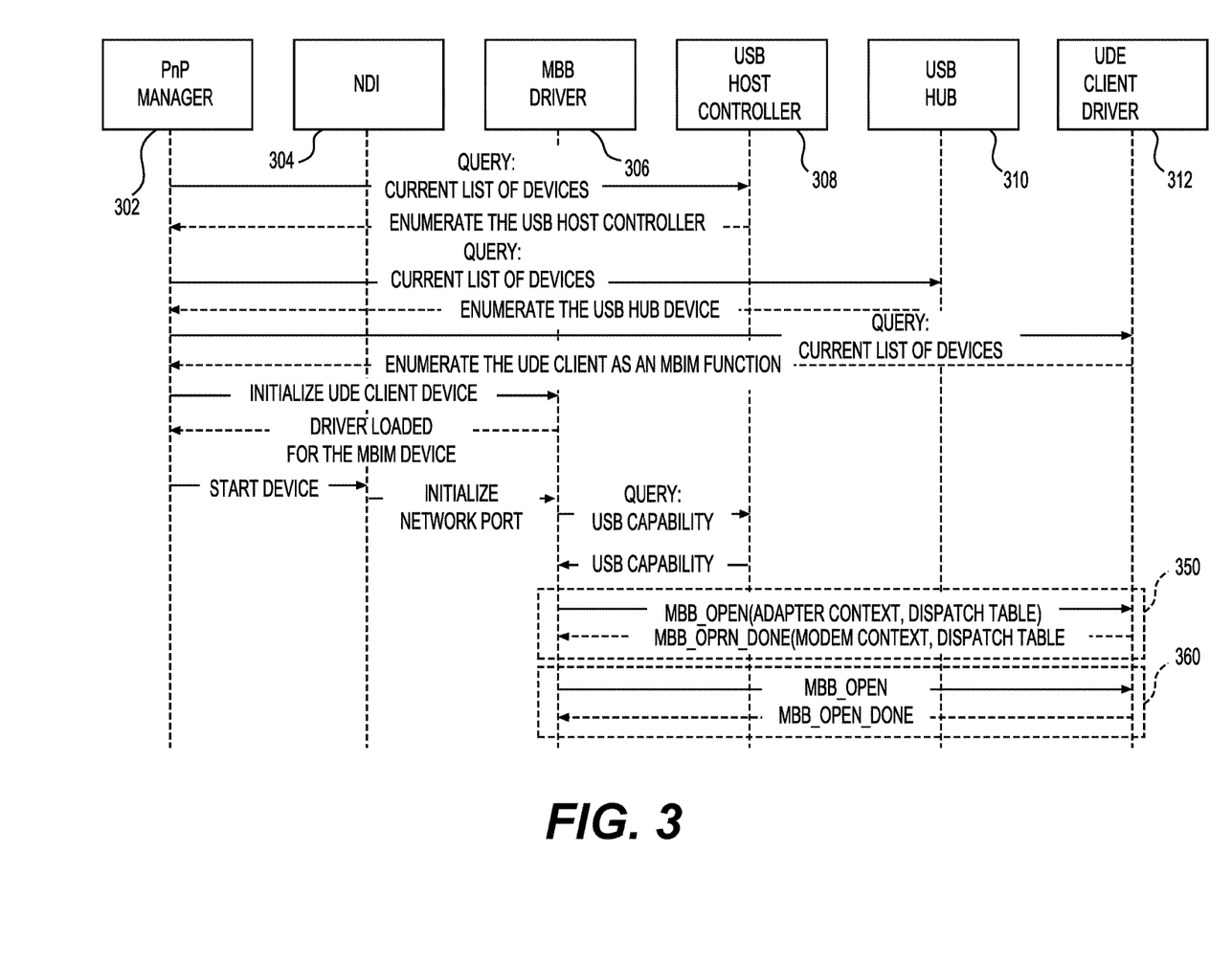
FIG. 3 shows a flow chart illustrating various steps for enumerating a shared control path to enable one of at least two data paths for a network device in accordance with one example.

FIG. 3 shows a flow chart illustrating various steps for enumerating a shared control path to enable one of at least two data paths for a network device (e.g., a modem) in accordance with one example. A plug-and-pay (PnP) manager 302 may be included as part of the operating system for computing system 10 including system 100. PnP manager 302 may enumerate and configure devices needed to implement a shared control path, and depending upon the data transfer capabilities a first path or a second path, where the second path may have a higher data transfer rate than the first data path. The first data path may involve using bulk-in and bulk-out pipes associated with a USB function and sending/receiving the data using USB NTBs. In this example, the second data path may be referred to as the FastIO data path. When the second data path is used to send or receive data, the data may no longer be transferred using the USB NTBs, instead as described later, the data is passed directly to the underlying device. As part of booting up or another type of event, such as addition of a network device, PnP manager 302 will enumerate a bus (e.g. bus 18 of FIG. 1), such as a PCIe bus. Subsequently, PnP manager 302 may enumerate all of the child devices on the bus as well. As part of this process, PnP manager 302 may send a query to a USB host controller 308 to determine the current list of devices associated with USB host controller 308. In this example, PnP manager 302 may send this query via the IRP_MN_QUERY_DEVICE_RELATIONS request. In response, USB host controller 308 may be enumerated and PnP manager 302 may be notified. PnP manager 302 may also configure any new or discovered devices. Next, PnP manager 302 may send a query to a USB hub 310 to determine the current list of devices associated with USB hub 310. In this example, for the Windows® operating system, PnP manager 302 may send this query via the IRP_MN_QUERY_DEVICE_RELATIONS request. In response, USB hub 310 may be enumerated and PnP manager 302 may be notified. Next, PnP manager 302 may send a query to a UDE client driver 312 to determine the current list of devices associated with UDE client driver 312. In this example, PnP manager 302 may send this query via the IRP_MN_QUERY_DEVICE_RELATIONS request. In response, UDE client driver 312 may be enumerated as a mobile broadband interface model (MBIM) function and PnP manager 302 may be notified.

With continued reference to FIG. 3, next, PnP manager 302 may send a request to MBB driver 306 (e.g., MBB driver 132 of FIG. 2) to initialize a UDE client device. MBB driver 306 may load the driver for the UDE client device and notify PnP manager 302. Next, PnP manager 302, after assigning hardware resources, if any, to the device, may start the UDE client device by sending a request (e.g., IRP_MN_START_DEVICE for the Windows® operating system) to NDI 304. NDI 304 (e.g., Network driver interface 112 of FIG. 2) may initialize a network port driver and related operations by: (1) setting up a network interface card (NIC) or a virtual NIC for network input/output operations, (2) claiming any hardware resources for the NIC (e.g., in the registry), and (3) allocating the resources. As an example, this process may include using the MiniportInitializeEx function for the Windows® operating system to initialize an adapter for network I/O operations. Each adapter may be a software object to represent each virtual or physical network device in system 100. NDI 304 may pass a handle to the software object, as needed, to the miniport driver's MiniportInitializeEx function for the Windows® operating system. The miniport driver may provide a DriverEntry function, which the operating system may call after it loads the driver. The MiniportInitializeEx function may perform several functions, including: (1) obtaining configuration information for the adapter, (2) obtaining information about the hardware resources for the adapter, (3) providing the attributes associated with the adapter, and (4) initializing the adapter-specific resources. For the MBB device (e.g., modem 170), the MiniportInitializeEx function may also initialize and open the various USB endpoints. As an example, the control endpoints, the interrupt endpoints, and the bulk endpoints may be opened. The control endpoints and the interrupt endpoints may be used to exchange control information between the operating system and the network device. The bulk endpoints may be used to transfer data.

In this example, to enable the FastIO data path a custom capability may be defined for the underlying USB device type, including USB emulated devices (e.g., UDE client driver 312 (also, e.g., UDE client driver 144 of FIG. 2)). For the Windows® operating system this capability may be added by, for example, DEFINE_GUID(GUID_USB_CAPABILITY_DEVICE_INFO, 0x146fed19, 0xeb71, 0x42a7, 0xb3, 0xeb, 0x38, 0x75, 0xde, 0xa6, 0x1d, 0x92). In addition, for an application to use a data path with a higher transfer rate than another data path with a lower transfer rate, MBB driver 306 (also, e.g., MBB driver 132 of FIG. 2) may use new data structures, e.g., an enum data structure and struct data structures, as shown in Table 1 below. These data structures may allow MBB driver 306 to determine the capabilities for transmitting or receiving data using the network device. As an example, these data structures and related functions may enable MBB driver 306 to determine whether a FastIO data path will be enabled or not. The data structures may include information that identify the device type and its version.

```
typedef enum _USB_CAP_DEVICE_TYPE
{
    USB_CAP_DEVICE_TYPE_USB = 0,
    USB_CAP_DEVICE_TYPE_UDE_MBIM,
    USB_CAP_DEVICE_TYPE_UDE_MBIM_FASTIO,
    USB_CAP_DEVICE_TYPE_MAXIMUM =
(USB_CAP_DEVICE_TYPE_UDE_MBIM_FASTIO + 1)
} USB_CAP_DEVICE_TYPE_;
typedef struct _USB_CAP_DEVICE_INFO_HEADER
{
    UCHAR DeviceMinorVersion;
    UCHAR DeviceMajorVersion;
    ULONG Reserved;
} USB_CAP_DEVICE_INFO_HEADER;
typedef struct _USB_CAP_DEVICE_INFO
{
    USB_CAP_DEVICE_INFO_HEADER DeviceInfoHeader;
} USB_CAP_DEVICE_INFO;
```

Still referring to FIG. 3, next, MBB driver 306 may send a query to USB host controller 308 to request capability information of a USB device. As an example, for the Windows® operating system, during initialization, MBB driver 306 may execute the windows driver function (WDF): WdfUsbTargetDeviceQueryUsbCapability to determine whether USB host controller 308 and the related USB drivers support the FastIO data path option. In response, USB host controller 308 may provide the capability information to MBB driver 306. As an example, for the Windows® operating system, USB host controller 308 may respond by providing the capability information via: GUID_USB_CAPABILITY_DEVICE_TYPE by using the callback EVT_UDECX_WDF_DEVICE_QUERY_USB_CAPABILITY, and return FastIO data path related information as USB_CAP_DEVICE_TYPE_UDE_MBIM_FASTIO type in the OutputBuffer. MBB driver 306 may save the device type in a data structure, for example, BUS_OBJECT for the Windows® operating system. To provide for a second data path with a higher transfer rate (e.g., FastIO), MBB driver 306 may determine whether the data transfer capabilities support the higher data transfer rate. As an example, for the Windows® operating system, MBB driver may determine if (USB_CAP_DEVICE_TYPE=USB_CAP_DEVICE_TYPE_UDE_MBIM_FASTIO).

With continued reference to FIG. 3, certain MBIM commands may be extended to establish the data path with a higher data rate. These commands may enable context exchange between MBB driver 306 and UDE client driver 312 for the higher data rate data path. As an example, for the Windows® operating system, MBB_OPEN_MESSAGE may be extended to include the adapter context (PMINIPORT_ADAPTER_CONTEXT) and the FastIO dispatch table from MBB driver 306. In this example, the adapter context may be a data structure to maintain device-specific state information that the corresponding driver may need to maintain. For example, adapter context may be used by the operating system to manage multiple adapters for MBB driver 306. Although there may be only one physical adapter, there could be numerous virtual adapters based on the additional packet data protocol (PDP) contexts. In this example, the dispatch table may be a series of pointers to driver callback routines. As an example, FastIOSendNetBufferListsComplete may be used for the FastIO data path enlightenment. The adapter context and session ID may be passed to the dispatch methods from MBB driver 306 to identify at least one unique data channel for the operating system. Session ID may be created to map NDIS_PORT_NUMBER when establishing a connection, to allow on-demand connections on the FastIO data path. Similarly, the MBB_OPEN_DONE may be extended to include the modem context and the dispatch table from UDE client driver 312. In this example, modem context may be a data structure to maintain modem-specific state information that the corresponding driver may need to maintain. Thus, as an example, FastIOSendNetBufferLists may be used. The modem context and the session ID may be passed to the dispatch handlers from UDE client driver 312 to identify at least one unique data session at the modem layer. In this example, these dispatch handlers from UDE client driver 312 may perform the sending/receiving of the data to/from the PCIe bus (or any other bus) device. As shown in FIG. 3, as an example, for the Windows® operating system, MBB driver may determine if (USB_CAP_DEVICE_TYPE=USB_CAP_DEVICE_TYPE_UDE_MBIM_FASTIO), and when that is the case, the MBB_OPEN(ADAPTER CONTEXT, DISPATCH TABLE) and MBB_OPEN_DONE(MODEM CONTEXT, DISPATCH TABLE) messages (shown as part of box 350) may be exchanged as part of the initialization of the FastIO data path. As part of the MBB_OPEN(ADAPTER CONTEXT, DISPATCH TABLE) message, MBB driver 306 and UDE client driver 312 may exchange the adapter context and the dispatch table. And, as part of the MBB_OPEN_DONE(MODEM CONTEXT, DISPATCH TABLE) message, MBB driver 306 and UDE client driver 312 may exchange the modem context and the dispatch table. In one example, MBB driver 306 and UDE client driver 312 will synchronously exchange the dispatch tables during initialization thus setting up all the function pointers that they can call into each other for enabling the FastIO data path. Alternatively, if the result of the previous test is that the FastIO capability is not supported, then MBB_OPEN and MBB_OPEN_DONE messages (shown as part of box 360) may be exchanged as part of the initialization of a data path with a lower transfer rate. The data path with the lower data rate may include MBB diver 306 converting data into USB NTBs for transfer via bulk-in and bulk-out pipes.

With respect to the operations of the sending of data via the network device and the receiving of data, using the FastIO data path, different handlers are exchanged as part of the MBB_OPEN_MESSAGE call from MBB driver 306. In one example, for the Windows® operating system, the data is sent and received by MBB driver 306, without converting the data into USB NTBs, using data structures that may be a combination of NET_BUFFER_LIST data structures and NET_BUFFER data structures or other similar data structures. The NET_BUFFER_LIST (NBL) data structure may specify a linked list of NET_BUFFER data structures. Each NET_BUFFER data structure may have a Memory Descriptor List (MDL) chain. In this example, MDLs map the address of data buffers to the data space that the NET_BUFFER data structures specify. They may be organized as a NULL-terminated singly linked list. In this example, only the driver that originates a NET_BUFFER_LIST may modify the linked list directly to insert or delete NET_BUFFER data structures. In one example, data-only interface 134 (FIG. 2) may interact with MBB driver 132 to enable send/receive operations. To make this process more efficient, the buffer ownership and management may be implemented such that the buffers are allocated up-front with enough space and in a DMA-ready fashion. This may mean cloning, copying, incremental buffer space allocation, or continuous DMA mapping/un-mapping may be un-necessary. And in-place modification of data packet contents may be allowed. Also, the buffers may be structured in a way to minimize the number of memory indirections/references needed to process a packet along with its metadata.

UDE client driver 312 may call FastIOSendNetBufferListsCompleteHandler to complete the NBLs that were passed to it as part of the FastIOSendNetBufferListsHandler call. UDE client driver 312 may specify the NBL as part of this call. Each NBL in the list may have a completion status code set as described in Table 3 below:

| Status Code | Description |
|---|---|
| NDIS_STATUS_SUCCESS | All the network data described by NET_BUFFER structures associated with this NET_BUFFER_LIST structure was successfully transmitted over the network. |
| NDIS_STATUS_INVALID_LENGTH | The size of the data in some NET_BUFFER structures associated with this NET_BUFFER_LIST structure was too large for the underlying NIC. |
| NDIS_STATUS_RESOURCES | The send request for this NET_BUFFER_LIST structure failed due to insufficient resources. |
| NDIS_STATUS_PAUSED | If a driver must reject send requests because it is paused, it sets the complete status in each affected NET_BUFFER_LIST to NDIS_STATUS_PAUSED. |
| NDIS_STATUS_SEND_ABORTED | NDI called the MiniportCancelSend function to cancel the send operation for this NET_BUFFER_LIST structure. |
| NDIS_STATUS_RESET_IN_PROGRRESS | The miniport driver aborted the send request due to a reset. |
| NDIS_STATUS_FAILURE | The send request for this NET_BUFFER_LIST structure failed due to insufficient resources. |

To differentiate between device service streams (DSS) and network data, each NET_BUFFER_LIST (NBL) may have context information indicating whether it is a DSS NBL or the NBLs from protocol drivers. In this example, DSS may relate to exchanges of information between the operating system and the network device and not include information that needs to transmitted or received via the antenna (e.g., antenna 58 of FIG. 1). DSS may be used by the operating system to directly communicate with the network device using proprietary commands. For the NBLs from the protocol driver, FastIOSendNetBufferListsCompleteHandler in MBB driver 306 may call NdisMSendNetBufferListsComplete to notify the protocol driver that owns these NBL's; the NET_BUFFER_LIST owner may then free the NET_BUFFER_LIST. For the DSS, the NBL may be created by MBB driver 306, and thus FastIOSendNetBufferCompleteHandler in MBB driver 306 may free it. The FastIOSendNetBufferListsCompleteHandler function may have the syntax shown in Table 4 below:

```
VOID FastIOSendNetBufferListsCompleteHandler(
    _In_ PVOID              MiniportAdapterContext,
    _In_ PNET_BUFFER_LIST   NetBufferLists,
    _In_ ULONG              SendCompleteFlags
);
```

Referring to Table 4 above, the MiniportAdapterContext parameter is the adapter context from MBB driver 306. The NetBufferLists parameter is a pointer to a linked list of NET_BUFFER_LIST structures. The SendCompleteFlags parameter can be set to zero to clear all of the flags and also using this function the current IRQL level can be indicated as being the dispatch level.

For receiving data from the network device via the FastIO data path, data-only controller 152 may create and initialize a NET_BUFFER_LIST by calling NdisAllocateNetBufferList function or NdisAllocateNetBufferAndNetBufferList function with the received data from modem 170, and then calling the FastIOIndicateReceiveNetBufferListsHandler function. In order to differentiate DSS and network data, the handler may provide extra context information indicating whether it is a DSS NBL or the NBLs for protocol drivers. For NBLs for protocol, FastIOIndicateReceiveNetBufferListsHandler may set SourceHandle member of each NET_BUFFER_LIST to be the MiniportAdapterHandle of MBB driver 306, and then call NdisMIndicateReceiveNetBufferLists to notify NDIS protocol driver for receiving the data. For DSS, the NBL may be parsed and copied to StatusBuffer of NDIS_STATUS_INDICATION and may be returned to the application by NdisMIndicateStatusEx. The FastIOIndicateReceiveNetBufferListsHandler function may have the syntax shown in Table 5 below:

```
VOID FastIO IndicateReceiveNetBufferListsHandler (
    _In_ PVOID              MiniportAdapaterContext,
    _In_ PNET_BUFFER_LIST   NetBufferLists,
    _In_ UCHAR              SessionId,
    _In_ ULONG              NumberOfNetBufferLists,
    _In_ ULONG              ReceiveFlags
);
```

Referring to Table 5 above, the MiniportAdapterContext parameter is the adapter context from MBB driver 306. The NetBufferLists parameter is a pointer to a linked list of NET_BUFFER_LIST structures. The SessionId parameter is created to map NDIS_PORT_NUMBER when establishing connection with MBB driver 306. The NumberOfNetBufferLists parameter is the number of NET_BUFFER_LIST structures that are in the linked list of structures at NetBufferLists. The ReceiveFlags parameter relates to flags that may define the receive operation.

With respect to the operations of the sending of data via the network device and the receiving of data, using the FastIO data path, different handlers are exchanged as part of the MBB_OPEN_DONE call from UDE client driver 312. These handlers from UDE client driver 312 may be called by MBB driver 306 in the corresponding callbacks. As an example, MBB driver 306 may call FastIOSendNetBufferListsHandler to send a linked list of NET_BUFFERS (NET_BUFFER_LIST) that the NDIS (e.g., NDI 304) may pass to MBB driver 306. The UDE client driver 312 may take the NET_BUFFER_LIST, and then call FastIOSendNetBufferListsCompleteHandler after either the data is queued for transmission or has been transmitted over the network device. In order to differentiate DSS and network data, the handler may include extra context information that indicates whether the packet belongs to DSS or to a protocol driver. UDE client driver 312 may send them to different channels according to modem context, session ID and data type. FastIOSendNetBufferListsCompleteHandler function may have the syntax shown in Table 6 below:

```
VOID FastIOSendNetBufferListsHandler(
    _In_PVOID              ModemContext,
    _In_PNET_BUFFER_LIST   NetBufferLists,
    _In_UCHAR              SessionId,
    _In_ULONG              SendFlags
)
```

Referring to Table 6 above, the ModemContext parameter is the modem context from UDE client driver 312. The NetBufferLists parameter is a pointer to a linked list of NET_BUFFER_LIST structures. The SessionId parameter is created to map NDIS_PORT_NUMBER when establishing connection with MBB driver 306. The NumberOfNetBufferLists parameter is the number of NET_BUFFER_LIST structures that are in the linked list of structures at NetBufferLists. The SendFlags parameter relates to flags that may define the send operation.

To return the ownership of NET_BUFFER_LIST structures to UDE client driver 312, MBB driver 306 may call FastIOReturnNetBufferListsHandler. UDE client driver 312 may then reuse them in a subsequent indication call—FastIOIndicateReceiveNetBufferListsHandler, or free them to the pool. FastIOReturnNetBufferListsHandler function may have the syntax shown in Table 7 below:

```
VOID FastIOReturnNetBufferListsHandler (
    _In_PVOID              ModemContext,
    _In_PNET_BUFFER_LIST   NetBufferLists,
    _In_ULONG              ReturnFlags
)
```

Referring to Table 7 above, the ModemContext parameter is the modem context from UDE client driver 312. The NetBufferLists parameter is a pointer to a linked list of NET_BUFFER_LIST structures. The NumberOfNetBufferLists parameter is the number of NET_BUFFER_LIST structures that are in the linked list of structures at NetBufferLists. The ReturnFlags parameter relates to NDIS flags that may be combined and can be used to indicate that the current IRQL is DISPATCH_LEVEL.

To cancel data transmission or reception via the network device, MBB driver 306 may call the FastIOCancelSendHandler to cancel all net buffer lists (e.g., NET_BUFFER_LIST), whose cancellation identifiers match the specified identifier. In response, UDE client driver 312 may perform several steps. First, UDE client driver 312 may traverse its list of queued NET_BUFFER_LIST structures for the specified adapter and call the NDIS_GET_NET_BUFFER_LIST_CANCEL_ID macro to obtain the cancellation identifier for each queued NET_BUFFER_LIST structure. UDE client driver 312 may then compare the cancellation identifier that NDIS_GET_NET_BUFFER_LIST_CANCEL_ID may return with the cancellation identifier that the NDIS passed to FastIOCancelSendHandler. Second, UDE client driver 312 may remove from the send queue (unlink) all NET_BUFFER_LIST structures, whose cancellation identifiers match the specified cancellation identifier. Third, UDE client driver 312 may call the FastIOSendNetBufferCompleteHandler function for all unlinked NET_BUFFER_LIST structures to return the structures. The Miniport driver may set the status field of the NET_BUFFER_LIST structures to NDIS_STATUS_SEND_ABORTED. In this example, DSS NBL may not be cancelable. FastIOCancelSendHandler function may have the syntax shown in Table 8 below:

```
VOID FastIOCancelSendHandler(
    _In_PVOID   ModemContext,
    _In_PVOID   CancelId
)
```

Referring to Table 8 above, the ModemContext parameter is the modem context from UDE client driver 312. The CancelId parameter is the cancellation identifier that specifies the NET_BUFFER_LIST structures that are being canceled.

To halt data transmission or reception via the network device (e.g., the modem), MBB driver 306 may call the FastIOHaltHandler. The FastIOHaltHandler may have the syntax shown in Table 9 below:

```
VOID FastIOHaltHandler(
    _In_PVOID              ModemContext,
    _In_NDIS_HALT_ACTION   HaltAction
)
```

Referring to Table 9 above, the ModemContext parameter is the modem context from UDE client driver 312. The HaltAction parameter is the reason for halting the adapter.

To pause data transmission or reception via the network device (e.g., the modem), MBB driver 306 may call the FastIOPauseHandler. Data transmission or reception may be paused as long as the FastIOPauseHandler returns. UDE client driver 312 may not return the handler until several things have happened. In this example, UDE client driver 312 may wait for all calls to the FastIOIndicateReceiveNetBufferListsHandler function to return. UDE client driver 312 may also wait for MBB driver 306 to return the ownership of all NET_BUFFER_LIST structures from outstanding receive indications to the UDE client driver's FastIOReturnNetBufferListsHandler function. UDE client driver 312 may be required to complete all outstanding send requests and call the FastIOSendNetBufferListsCompleteHandler function for all the outstanding send requests that have been sent to network device (e.g., the modem). UDE client driver 312 may reject all new send requests made to its FastIOSendNetBufferListsHandler function by calling FastIOSendNetBufferListsCompleteHandler. UDE client driver 312 should set the complete status in each NET_BUFFER_LIST to NDIS_STATUS_PAUSED. The FastIOPauseHandler may have the syntax shown in Table 10 below:

```
NDIS_STATUS FastIOPauseHandler(
    _In_PVOID          ModemContext
)
```

Referring to Table 10 above, the ModemContext parameter is the modem context from UDE client driver 312.

To shut down the FastIO data path, MBB driver 306 may send two command IDs (via the control path shown in FIG. 2) to shut down the underlying UDE client driver 312. The two command IDs may be MBB_HOSTSHUTDOWN_CID_PRESHUTDOWN and MBB_HOSTSHUTDOWN_CID_ONE. UDE client driver 312 may handle the shutdown sequence in response to these two command IDs. UDE client driver 312 may use the FastIOShutdownHandler function after the MBB_HOSTSHUTDOWN_CID_ONE is completed by UDE driver 312. The FastIOShutdownHandler may have the syntax shown in Table 11 below:

```
VOID FastIOShutdownHandler(
    _In_PVOID                   ModemContext,
    _In_NDIS_SHUTDOWN_ACTION    ShutdownAction
)
```

Referring to Table 11 above, the ModemContext parameter is the modem context from UDE client driver 312. The parameter ShutdownAction may provide the reason why NDI 304 called the shutdown function. The reasons may be because the system is shutting down or because there is a system error.

MBB driver 306 may also implement a FastIOResetHandler for resetting the FastIO data path. In addition, MBB driver 306 may call FastIORestartHandler to resume data plane that is paused by FastIOPauseHandler. Restart will complete the restart as long as FastIORestartHandler returns. The FastIORestartHandler may have the syntax shown in Table 12 below:

```
NDIS_STATUS FastIORestartHandler (
    _In_PVOID          ModemContext
)
```

Referring to Table 12 above, the ModemContext parameter is the modem context from UDE client driver 312.

As part of the data path teardown, the EvtDeviceD0ExitCallback function for UDE client driver 312 may be called. Then EvtDeviceReleaseHardware function may be called. UDE client driver 312 may plug out the virtual USB device (that is initialized and plugged in EvtDriverDeviceAdd) in EvtDeviceD0ExitCallback when the TargetState is WdfPowerDeviceD3Final or in EvtDeviceReleaseHardware. As a result, MBB driver 306 may be halted and unloaded. Then EvtCleanupCallback may be called to free the resources being used. Although at least some of the above functions and structures relate to the Windows® operating system and the Mobile Broadband Interface Model (MBIM), the disclosure is not limited as such. The described functions and structures can be used to implement a shared control path for at least two data paths using other operating systems and platforms.

With respect to the operation of computing system 10 with system 100, the process for installing the USB MBIM device may include using an INF file to expose the MBIM function. An MBIM function may be a USB function within a USB device that is compatible with the Mobile Broadband Interface Model specification. Table 13 below shows an example INF file.

```
; UDEMbimClient.inf
; Copyright (c) Microsoft Corporation. All rights reserved.
;[Version]
signature="$Windows NT$"
Class=USB
ClassGUID={36FC9E60-C465-11CF-8056-444553540000}
Provider=%Msft%
CatalogFile=delta.CAT
[SourceDisksNames]
3426=windows cd
[SourceDisksFiles]
UDEMbimClient.sys = 3426
[ControlFlags]
ExcludeFromSelect = *
[DestinationDirs]
DefaultDestDir = 12
[Manufacturer]
%MSFT%=Generic,NTx86,NTamd64,NTarm,NTarm64
;
; --------------------- Hardware & Compatible IDs ---------------------
;
[Generic.NTx86]
%ROOTENUM.DeviceDesc%=Generic.Install,ROOT\UDEMbimClient
[Generic.NTamd64]
%ROOTENUM.DeviceDesc%=Generic.Install,ROOT\UDEMbimClient
[Generic.NTarm]
%ROOTENUM.DeviceDesc%=Generic.Install,ROOT\UDEMbimClient
[Generic.NTarm64]
%ROOTENUM.DeviceDesc%=Generic.Install,ROOT\UDEMbimClient
[Generic.Install.NT]
CopyFiles=Generic.CopyFiles
;
; FeatureScore values between 0x00-0x7F are reserved. Values 0x81-
0xFE are for OEMs.
;
FeatureScore=80
[Generic.Install.NT.HW]
AddReg=Generic_AddReg.HW
Include=machine.inf
Needs=PciD3ColdSupported
[Generic_AddReg.HW]
HKR,"EnhancedPowerManagementEnabled",0x00010001,1
[Generic.Install.NT.Services]
AddService=UDEMbimClient, 2, Generic.AddService
[Generic.AddService]
DisplayName = %UDEMbimClient%.DeviceDesc%
ServiceType = 1
StartType = 3
ErrorControl = 1
ServiceBinary = %12%\UDEMbimClient.SYS
Dependencies = ucx01000, udecx
[Generic.CopyFiles]
UDEMbimClient.SYS,,,0x100
;
; --------------------- Strings ---------------------
;
[Strings]
;Non-Localizable
Msft = "Microsoft"
;Localizable
UDEMbimClient.DeviceDesc = "Emulated USB MBIM Device"
ROOTENUM.DeviceDesc = "Emulated USB MBIM Client Device"
```

Figure 4:
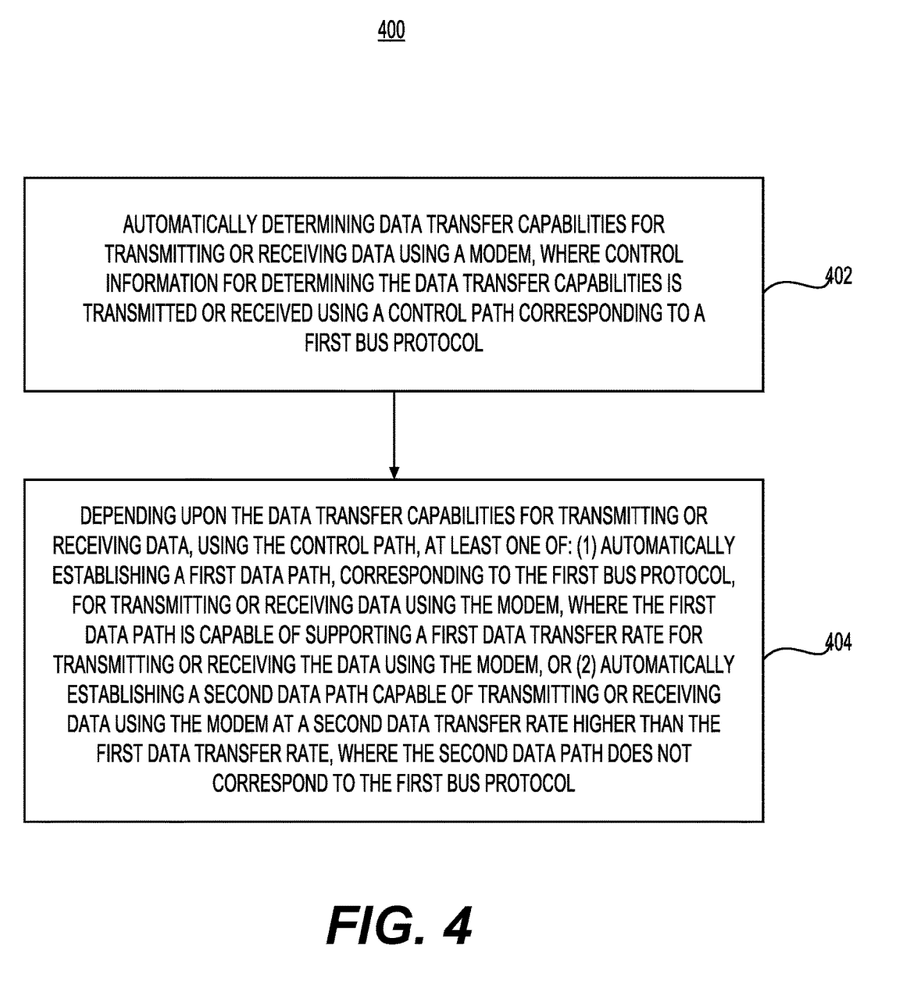
FIG. 4 shows a flow chart for a method in accordance with one example.

FIG. 4 shows a flow chart for a method 400 in accordance with one example. Method 400 may be performed as part of computing system 10 comprising system 100. In step 402, a component of the operating system, for example mobile broadband service 110, may automatically determine data transfer capabilities for transmitting or receiving data using a network device (e.g., the modem), where control information for determining the data transfer capabilities is transmitted or received using a control path corresponding to a first bus protocol. MBB driver 306, using a shared control path (e.g., control pipe corresponding to the universal serial bus) may obtain control information corresponding to a data path within the network device. As explained before with respect to FIG. 3, the data transfer capabilities may be determined by MBB driver 306. As an example, for the Windows® operating system, MBB driver may determine if (USB_CAP_DEVICE_TYPE=USB_CAP_DEVICE_TYPE_UDE_MBIM_FASTIO).

With continued reference to FIG. 4, in step 404 various components of the operating system, for example, components shown as part of system 100, may depending upon the data transfer capabilities for transmitting or receiving data, using the control path, at least one of: (1) automatically establish a first data path, corresponding to the first bus protocol, for transmitting or receiving data using the network device (e.g., the modem), where the first data path is capable of supporting a first data transfer rate for transmitting or receiving the data using the network device (e.g., the modem), or (2) automatically establish a second data path capable of transmitting or receiving data using the network device (e.g., the modem) at a second data transfer rate higher than the first data transfer rate, where the second data path does not correspond to the first bus protocol. As explained before with respect to FIG. 3 (e.g., boxes 350 and 360), after the data transfer capabilities are determined, a first data path or a second data path may be established. Thus, if the data transfer capabilities are determined to be capable of supporting the first data path, within the device, the first data path within the device may be automatically established. The first data path may not correspond to the first bus protocol (e.g., the universal serial bus protocol).

Figure 5:
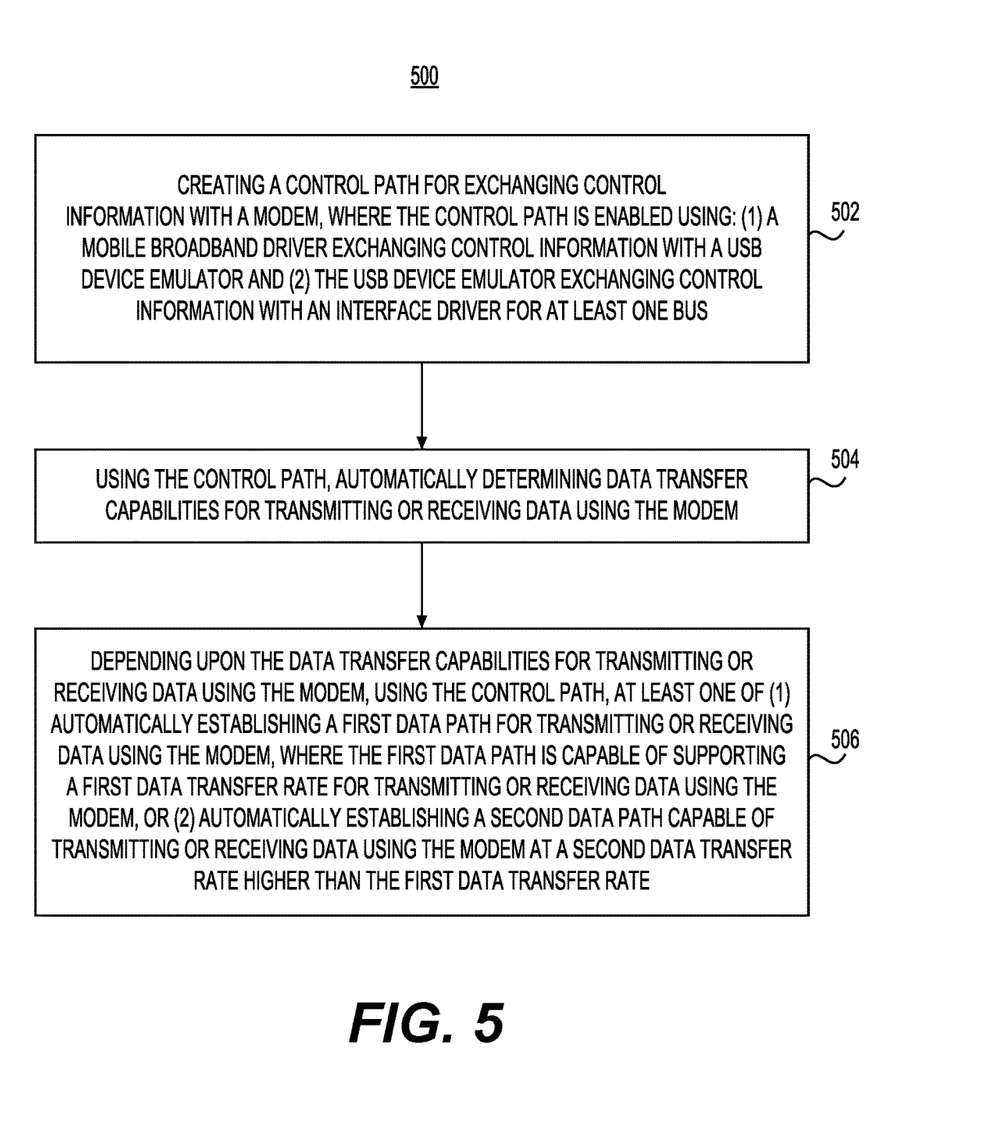
FIG. 5 shows a flow chart for another method in accordance with one example.

FIG. 5 shows a flow chart for another method 500 in accordance with one example. Method 500 may be performed as part of computing system 10 comprising system 100. In step 502, a component of the operating system, for example mobile broadband service 110 may in response to a request from a mobile broadband service to communicate using the network device (e.g., the modem), create a control path for exchanging control information with the network device (e.g., the modem), where the control path is enabled using: (1) a mobile broadband driver exchanging control information with a USB device emulator and (2) the USB device emulator exchanging control information with an interface driver for the at least one bus. As explained earlier with respect to FIG. 2 and FIG. 3, MBB driver 306 exchanges control information with UDE client driver 312 to enumerate the control path that uses at least one control pipe based on the USB protocol. The control information may be exchanged using command IDs.

With continued reference to FIG. 5, in step 504 various components of the operating system, for example components shown as part of system 100, may, using the control path, automatically determine data transfer capabilities for transmitting or receiving data using the network device (e.g., the modem). As explained before with respect to FIG. 3, the data transfer capabilities may be determined by MBB driver 306. As an example, for the Windows® operating system, MBB driver may determine if (USB_CAP_DEVICE_TYPE=USB_CAP_DEVICE_TYPE_UDE_MBIM_FASTIO).

Still referring to FIG. 5, in step 506, various components of the operating system, for example components shown as part of system 100, may, depending upon the data transfer capabilities for transmitting or receiving data using the network device (e.g., the modem), using the control path, at least one of: (1) automatically establish a first data path for transmitting or receiving data using the network device (e.g., the modem), where the first data path is capable of supporting a first data transfer rate for transmitting or receiving the data using the network device (e.g., the modem), or (2) automatically establish a second data path capable of transmitting or receiving data using the network device (e.g., the modem) at a second data transfer rate higher than the first data transfer rate. As explained before with respect to FIG. 3 (e.g., boxes 350 and 360), after the data transfer capabilities are determined, a first data path or a second data path may be established.

In conclusion, a method for allowing a device to communicate data, over a network, using a shared control path, within the device, corresponding to a first bus protocol is provided. The method may include using the shared control path, obtaining control information corresponding to a data path, within the device, for allowing the device to communicate data over the network using a network interface. The method may further include automatically determining data transfer capabilities for transmitting or receiving data using the network interface based on the control information, if the data transfer capabilities are determined to be capable of supporting a first data path, within the device, automatically establishing the first data path within the device having a first data rate, where the first data path does not correspond to the first bus protocol, and if the data transfer capabilities are determined to be incapable of supporting the first data path, automatically establishing a second data path within the device having a second data rate lower than the first data rate, where the second data path corresponds to the first bus protocol.

In this example, the first bus protocol may comprise the universal serial bus protocol. In addition, the shared control path may comprise a control pipe corresponding to the universal serial bus protocol and the second data path comprises a data pipe corresponding to the universal serial bus protocol. The method may further include a mobile broadband driver querying a universal serial bus (USB) host controller for obtaining the control information corresponding to the data path. In this example, the automatically establishing the first data path may further comprise enabling a plurality of buffer structures for exchanging data between a mobile broadband driver and the network interface. In addition, the automatically establishing the first data path may further comprise the mobile broadband driver providing adapter context information to a universal serial bus (USB) client driver.

In another example, the present disclosure relates to a computer-readable medium including instructions corresponding to a method for allowing a device to communicate data, over a network, using a shared control path, within the device, corresponding to a first bus protocol. The method may include using the shared control path, obtaining control information corresponding to a data path, within the device, for allowing the device to communicate data over the network using a network interface. The method may further include automatically determining data transfer capabilities for transmitting or receiving data using the network interface based on the control information, if the data transfer capabilities are determined to be capable of supporting a first data path, within the device, automatically establishing the first data path within the device having a first data rate, where the first data path does not correspond to the first bus protocol, and if the data transfer capabilities are determined to be incapable of supporting the first data path, automatically establishing a second data path within the device having a second data rate lower than the first data rate, where the second data path corresponds to the first bus protocol.

In this example, the first bus protocol may comprise the universal serial bus protocol. In addition, the shared control path may comprise a control pipe corresponding to the universal serial bus protocol and the second data path comprises a data pipe corresponding to the universal serial bus protocol. The computer-readable medium may further include instructions for a method including a mobile broadband driver querying a universal serial bus (USB) host controller for obtaining the control information corresponding to the data path. In this example, the automatically establishing the first data path may further comprise enabling a plurality of buffer structures for exchanging data between a mobile broadband driver and the network interface. In addition, the automatically establishing the first data path may further comprise the mobile broadband driver providing adapter context information to a universal serial bus (USB) client driver.

In yet another example, the present disclosure relates to a system including a processor and a modem, coupled to the processor via at least one bus, to allow the processor to communicate data over a network. The system may further include a mobile broadband driver, configured to allow the processor to: using a shared control path corresponding to a first bus protocol, obtain control information corresponding to a data path, within the device, for communicating data over the network using the modem, and automatically determine data transfer capabilities for allowing the processor to communicate data using the modem based on the control information, if the data transfer capabilities are determined to be capable of supporting a first data path, within the device, automatically establish the first data path within the device having a first data rate, where the first data path does not correspond to the first bus protocol, and if the data transfer capabilities are determined to be incapable of supporting the first data path, automatically establish a second data path, within the device, having a second data rate lower than the first data rate, where the second data path corresponds to the first bus protocol.

In this example, the first bus protocol may comprise the universal serial bus protocol. In addition, the shared control path may comprise a control pipe corresponding to the universal serial bus protocol and the second data path comprises a data pipe corresponding to the universal serial bus protocol. The system may further include a universal serial bus (USB) client driver and where the mobile broadband driver is further configured to query a universal serial bus (USB) host controller for obtaining the control information corresponding to the data path. The mobile broadband driver may further be configured to enable a plurality of buffer structures for allowing direct communication between the mobile broadband driver and the modem. The mobile broadband driver may further be configured to provide adapter context information to a universal serial bus (USB) client driver, where the adapter context information comprises at least one data structure including state information for the modem.

It is to be understood that the systems, methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for allowing a device to communicate data, over a network, using a shared control path, within the device, corresponding to a first bus protocol, the method comprising:
using the shared control path, obtaining control information corresponding to a data path, within the device, for allowing the device to communicate data over the network using a network interface; and
automatically determining data transfer capabilities for transmitting or receiving data using the network interface based on the control information,
if the data transfer capabilities are determined to be capable of supporting a first data path, within the device, automatically establishing the first data path within the device having a first data rate, wherein the first data path does not correspond to the first bus protocol, and
if the data transfer capabilities are determined to be incapable of supporting the first data path, automatically establishing a second data path within the device having a second data rate lower than the first data rate, wherein the second data path corresponds to the first bus protocol.

2. The method of claim 1, wherein the first bus protocol comprises the universal serial bus protocol.

3. The method of claim 2, wherein the shared control path comprises a control pipe corresponding to the universal serial bus protocol.

4. The method of claim 2, wherein the second data path comprises a data pipe corresponding to the universal serial bus protocol.

5. The method of claim 1 further comprising a mobile broadband driver querying a universal serial bus (USB) host controller for obtaining the control information corresponding to the data path.

6. The method of claim 1, wherein the automatically establishing the first data path further comprising enabling a plurality of buffer structures for exchanging data between a mobile broadband driver and the network interface.

7. The method of claim 6, wherein the automatically establishing the first data path further comprising the mobile broadband driver providing adapter context information to a universal serial bus (USB) client driver.

8. A non-transitory computer-readable medium comprising instructions corresponding to a method for allowing a device to communicate data, over a network, using a shared control path, within the device, corresponding to a first bus protocol, the method comprising:
using the shared control path, obtaining control information corresponding to a data path, within the device, for communicating data over the network using a network interface; and
automatically determining data transfer capabilities for transmitting or receiving data using the network interface based on the control information,
if the data transfer capabilities are determined to be capable of supporting a first data path, within the device, automatically establishing the first data path within the device having a first data rate, wherein the first data path does not correspond to the first bus protocol, and
if the data transfer capabilities are determined to be incapable of supporting the first data path, automatically establishing a second data path within the device having a second data rate lower than the first data rate, wherein the second data path corresponds to the first bus protocol.

9. The non-transitory computer-readable medium of claim 8, wherein the first bus protocol comprises the universal serial bus protocol.

10. The non-transitory computer-readable medium of claim 9, wherein the shared control path comprises a control pipe corresponding to the universal serial bus protocol.

11. The non-transitory computer-readable medium of claim 9, wherein the second data path comprises a data pipe corresponding to the universal serial bus protocol.

12. The non-transitory computer-readable medium of claim 8, wherein the method further comprising a mobile broadband driver querying a universal serial bus (USB) host controller for obtaining the control information corresponding to the data path.

13. The non-transitory computer-readable medium of claim 12, wherein the automatically establishing the first data path further comprising the mobile broadband driver providing adapter context information to a universal serial bus (USB) client driver.

14. The non-transitory computer-readable medium of claim 12, wherein the automatically establishing the first data path further comprising enabling a plurality of buffer structures for exchanging data between the mobile broadband driver and the network interface.

15. A device comprising:
a processor;
a modem, coupled to the processor via at least one bus, to allow the processor to communicate data over a network;
a mobile broadband driver, configured to allow the processor to:
using a shared control path corresponding to a first bus protocol, obtain control information corresponding to a data path, within the device, for communicating data over the network using the modem, and
automatically determine data transfer capabilities for allowing the processor to communicate data using the modem based on the control information,
if the data transfer capabilities are determined to be capable of supporting a first data path, within the device, automatically establish the first data path within the device having a first data rate, wherein the first data path does not correspond to the first bus protocol, and
if the data transfer capabilities are determined to be incapable of supporting the first data path, automatically establish a second data path, within the device, having a second data rate lower than the first data rate, wherein the second data path corresponds to the first bus protocol.

16. The device of claim 15, wherein the first bus protocol comprises the universal serial bus protocol and wherein the second data path comprises a data pipe corresponding to the universal serial bus protocol.

17. The device of claim 15, wherein the first bus protocol comprises the universal serial bus protocol and wherein the shared control path comprises a control pipe corresponding to the universal serial bus protocol.

18. The device of claim 15 further comprising a universal serial bus (USB) client driver and wherein the mobile broadband driver is further configured to query a universal serial bus (USB) host controller for obtaining the control information corresponding to the data path.

19. The device of claim 18, wherein the mobile broadband driver is further configured to enable a plurality of buffer structures for allowing direct communication between the mobile broadband driver and the modem.

20. The device of claim 18, wherein the mobile broadband driver is further configured to provide adapter context information to a universal serial bus (USB) client driver, wherein the adapter context information comprises at least one data structure including state information for the modem.

* * * * *